(12) United States Patent
Coller, Jr. et al.

(10) Patent No.: US 7,515,787 B2
(45) Date of Patent: Apr. 7, 2009

(54) IMAGING DEVICE FOR OPTICALLY EXTRACTING FEATURES OF AN OBJECT

(75) Inventors: John A. Coller, Jr., Redwood City, CA (US); Michael J. Fero, Portola Valley, CA (US); Ian C. Hsu, 61-1 East Yun (TW); Ching-Lung Huang, Tainan (TW)

(73) Assignees: The Board of Trustees of the Lelland Stanford Junior University, Palo Alto, CA (US); National Tsing Hua University, Hsinchu (TW)

( * ) Notice: Subject to any disclaimer, the term of this patent is extended or adjusted under 35 U.S.C. 154(b) by 363 days.

(21) Appl. No.: 11/327,287

(22) Filed: Jan. 6, 2006

(65) Prior Publication Data

US 2006/0238855 A1  Oct. 26, 2006

(51) Int. Cl.
*G02B 6/42* (2006.01)

(52) U.S. Cl. .............................. 385/31; 385/33; 385/37; 353/94

(58) Field of Classification Search ................... 385/31, 385/32, 37; 353/94
See application file for complete search history.

(56) References Cited

U.S. PATENT DOCUMENTS

| | | | |
|---|---|---|---|
| 3,990,087 A | 11/1976 | Marks et al. .................. 354/117 |
| 5,567,294 A | 10/1996 | Dovichi et al. ............... 204/603 |
| 5,572,034 A | 11/1996 | Karellas ...................... 250/368 |
| 6,317,443 B1 * | 11/2001 | Craig et al. ............... 372/38.04 |
| 6,558,623 B1 | 5/2003 | Ganz et al. ..................... 422/63 |
| 6,754,414 B2 | 6/2004 | Naghieh et al. ................ 385/33 |
| 6,902,897 B2 | 6/2005 | Tweedie et al. ................. 435/6 |
| 6,999,657 B2 * | 2/2006 | Walt ............................. 385/31 |
| 7,123,791 B2 * | 10/2006 | Yee et al. ....................... 385/33 |
| 2003/0223685 A1 * | 12/2003 | Hasegawa et al. .............. 385/31 |
| 2004/0115877 A1 | 6/2004 | Iddan .......................... 438/200 |

* cited by examiner

*Primary Examiner*—James P Hughes
(74) *Attorney, Agent, or Firm*—Lumen Patent Firm

(57) ABSTRACT

The present invention provides a method and device for optically extracting discrete features of an object. With this method and device, small regions of interest or features within a relatively large object are optically extracted and collated into a single, condensed image. The condensed image contains all of the features in the original object, but not the parts of the object that are between the features. Thus, the optically extracted features can be viewed at high resolution, but in a limited field of view. Examples of objects that may be optically extracted according to the invention include spots of biomaterial on a biochip, material in wells of a microtiter plate, etc. In addition, this device and method can be used for non-planar objects. In this case, the device and method allow simultaneous visualization of spatially separated features on a surface of a 3-dimensional object.

20 Claims, 3 Drawing Sheets

IMAGING DEVICE FOR OPTICALLY EXTRACTING FEATURES OF AN OBJECT

CROSS-REFERENCE TO RELATED APPLICATIONS

This application claims priority from Taiwanese application number 94100385, filed Jan. 6, 2005, which is incorporated herein by reference.

FIELD OF THE INVENTION

The present invention relates generally to imaging. More particularly, the present invention relates to methods and devices for optically extracting discrete features of an object.

BACKGROUND

There are many applications for which features of interest are small compared to the size of the object. For example, in microarrays and other biochips, small spots of nucleic acids or other biomolecules are spatially separated into an array of spots. Similarly, in microtiter plates, substances in wells are small compared to the size of the plate. Traditional imaging systems do not allow high resolution imaging of relatively small features without a corresponding expansion of the field of view. For example, if one were to take an image of a microarray at a high enough resolution to visualize the morphology of the spots, the resultant image would be extremely large, and would likely require the viewer to pan through the image in order to visualize all of the spots. Thus, multiple image acquisition systems are often used in a confined space for imaging a single microarray. These systems require complicated software to automate visual inspection and measurement of the spots. Alternatively, one imaging system may be used that moves in order to scan different spots on the microarray. In this case, the imaging of a full microarray the can be very time consuming. Accordingly, there is a need in the art to develop methods and devices for imaging small, spatially separated features. Such methods and devices should allow high resolution images of the features to be quickly acquired and displayed in a limited field of view without the need for complex imaging software.

SUMMARY OF THE INVENTION

The present invention provides a method and device for optically extracting discrete features of an object. With this method and device, small regions of interest or features within a relatively large object are optically extracted and collated into a single, condensed image. The condensed image contains all of the features in the original object, but not the parts of the object that are between the features. Thus, the optically extracted features can be viewed at high resolution, but in a limited field of view. Examples of objects that may be optically extracted according to the invention include spots of biomaterial on a biochip, material in wells of a microtiter plate, etc. In addition, this device and method can be used for non-planar objects. In this case, the device and method would allow simultaneous visualization of spatially separated features on a surface of a 3-dimensional object.

A device according to the present invention contains a plurality of image conduits, with each image conduit having a first and a second end. A guiding element is used to fix the first and second ends of the image conduits into a first and second pattern, respectively. The first pattern corresponds to a pattern of discrete features of an object, such that the first ends of the image conduits may acquire images of these discrete features. As there are no image conduits corresponding to the remainder of the object, this arrangement results in only the discrete features being imaged. Once the images have been acquired, they are optically transmitted along the image conduits to the second ends. Preferably, this transmission maintains the size and resolution of the acquired images. This may be accomplished by using image conduits with a uniform diameter. The second pattern, for the second ends, serves to spatially rearrange the optically transmitted images such that all of the optically transmitted images may be simultaneously visualized in one field of view.

Any image conduits may be used according to the present invention, including but not limited to one or more optical fibers. Similarly, the guiding element may be any element that fixes the direction and angle of the image conduits, such as a frame or an array of adjustable microholders. Preferably, the guiding element is designed to have an adjustable angle in a limited range. In one embodiment, the guiding element is a frame with a first penetrating layer and a second penetrating layer. In this case, the first ends of the image conduits are connected to the first penetrating layer and the second ends of the image conduits are connected to the second penetrating layer. The penetrating layers may be made of any material, including but not limited to Teflon. More preferably, the guiding element has a flexible layer interposed between the penetrating layers. This layer may be made of, e.g., flexible O-rings, with the number of O-rings corresponding to the number of image conduits.

In a preferred embodiment, the imaging device also includes one or more lenses. The lenses serve to magnify the images of the discrete features. Preferably, the one or more lenses are GRIN lenses.

In a preferred embodiment, the imaging device also includes an image-capturing element optically connected to the second ends of the image conduit. The imaging-capturing element may be a simple image-enlarging device to make the images visible to the naked eye. Alternatively, or in addition, a photographic device such as a CCD camera may be used to deliver the images to a computer or a monitor.

The present invention also provides a method of optically extracting discrete features of an object. With this method, a plurality of image conduits having first and second ends is provided. Next, the first ends of the image conduits are guided into a first pattern and the second ends are guided into a second pattern. The first pattern corresponds to the pattern of discrete features on the object and the second pattern is a spatially rearranged version of the first pattern. Preferably, the second pattern is a spatially condensed version of the first pattern. Next, images are acquired of the discrete features of the object, but not of space between the discrete features, with the first ends. These images are then optically transmitted along the image conduits to the second ends of the conduits. Preferably, this optical transmission maintains or increases the size of the acquired images, and maintains the resolution of the acquired images. Finally, the acquired images of the discrete features are visualized in one field of view.

BRIEF DESCRIPTION OF THE FIGURES

The present invention together with its objectives and advantages will be understood by reading the following description in conjunction with the drawings, in which.

DETAILED DESCRIPTION OF THE INVENTION

Figure 1:
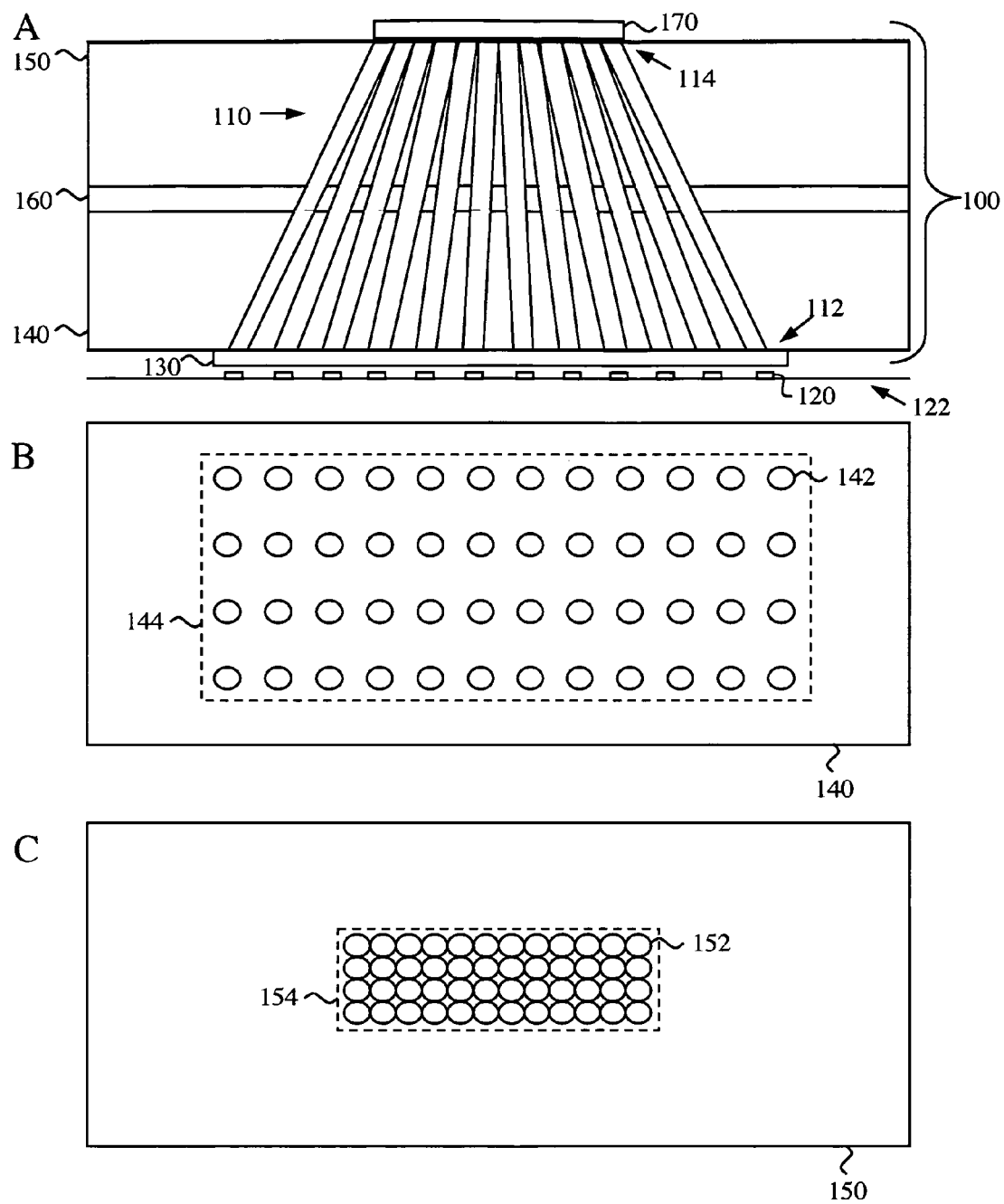
FIG. 1 shows an example of an imaging device according to the present invention.

The present invention provides an imaging device for optically extracting discrete features of an object. FIG. 1 illustrates an example of an imaging device according to the present invention. FIG. 1A shows a cross section of imaging device 100. Imaging device 100 has 48 image conduits 110, 12 of which can be seen in this cross section. Each of the image conduits 110 has a first end 112 and a second end 114. The first ends 112 serve to acquire images of features 120 of object 122 through lens 130. The image conduits are fixed in position by first penetrating layer 140, second penetrating layer 150, and flexible layer 160, for example by compressing flexible layer 160 between first penetrating layer 140 and second penetrating layer 150. Once images have been acquired, they are optically transmitted through image conduits 110 to second ends 114. The images are then collected by image capturing element 170.

FIG. 1B and FIG. 1C are planar sections of the bottom of first penetrating layer 140 and the top of second penetrating layer 150, respectively. First penetrating layer 140 has holes 142 for insertion of first ends 112. Holes 142 are arranged in a first pattern, indicated by dashed rectangle 144, such that first ends 114 spatially correspond to features 120. Second penetrating layer 150 has holes 152 for insertion of second ends 114. Holes 152 are arranged in a second pattern, indicated by dashed rectangle 154, which corresponds to the area of image capturing element 170. Second pattern 154 is a spatially condensed version of first pattern 144, and allows all of the acquired images to be viewed simultaneously by image capturing element 170.

In a preferred embodiment, image conduits 110 are one or more optical fibers. Preferably, the conduits have a diameter of between about 0.1 mm and about 2 mm. Also preferably, first pattern 144 is at least 2 times larger, preferably between about 75 and about 1000 times larger, than second pattern 154.

Preferably, first penetrating layer 140 and second penetrating layer 150 are made of Teflon. Flexible layer 160 may be a set of flexible O-rings that fit around each image conduit. Also preferably, lens 130 is a GRIN lens and image-capturing element 170 is a CCD camera. Either one lens could be used, as shown, or individual lenses could be used for each image conduit. The imaging device need not have either an imaging capturing element or a lens to function according to the present invention.

In one embodiment, the lens(es) are fixed to first penetrating layer 140 through an image collecting layer, such as a glass plate (not shown). In this case, the lens(es) would be adhered to the image collecting layer by optical glue, and the coefficient of refraction of the lens(es) and the image collecting layer would be substantially identical. The lens(es) (or image collecting layer) is preferably adhered to second ends 114 and first penetrating layer 140 with material having a substantially identical refraction coefficient to the image conduits 110 to ensure that no void exists between the surfaces. Preferably, light traveling in the lens(es) and/or image collecting layer comes from through the object, and the direction of light leaving the lens(es) and/or image collecting layer is aligned with a normal line of the contact surface between the image conduit and the lens(es) and/or image collecting layer, such that the light will enter the image conduit.

Figure 2:
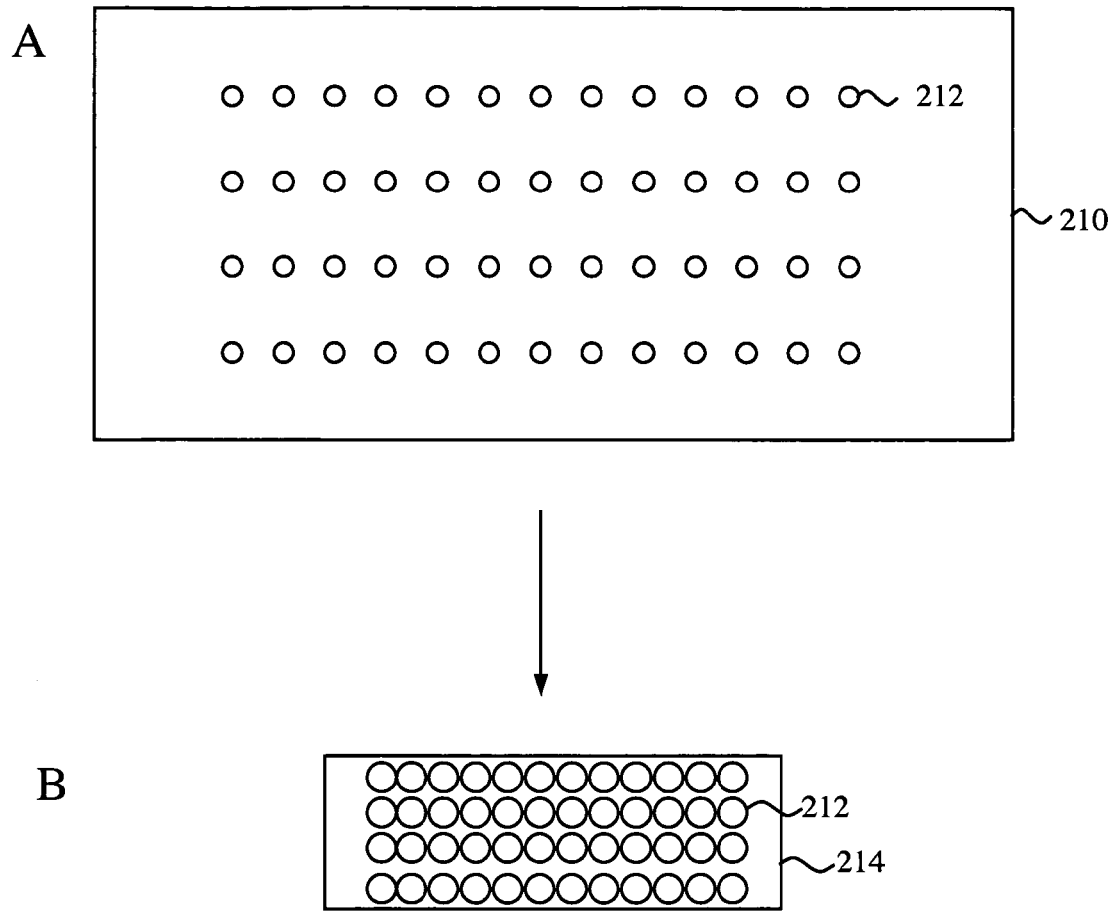
FIG. 2 shows an example of optical extraction of discrete features according to the present invention.

FIG. 2 shows a schematic of a result that can be obtained from the imaging device shown in FIG. 1. FIG. 2A shows microscope slide 210, with spots of biomaterial 212 arranged in a 12×4 matrix on microscope slide 210. The spots 212 are spatially separated features on slide 210. FIG. 2B shows a schematic of spots 212 that have been optically extracted by an imaging device according to the present invention, such as that shown in FIG. 1. Spots 212 have been selectively imaged and magnified, while slide 210 has not been imaged. The imaged spots 212 have been brought together through optical conduits and these collated images have been captured by an image capturing element. This results in a new image 214 that contains only spots 212 in a limited field of view.

Figure 3:
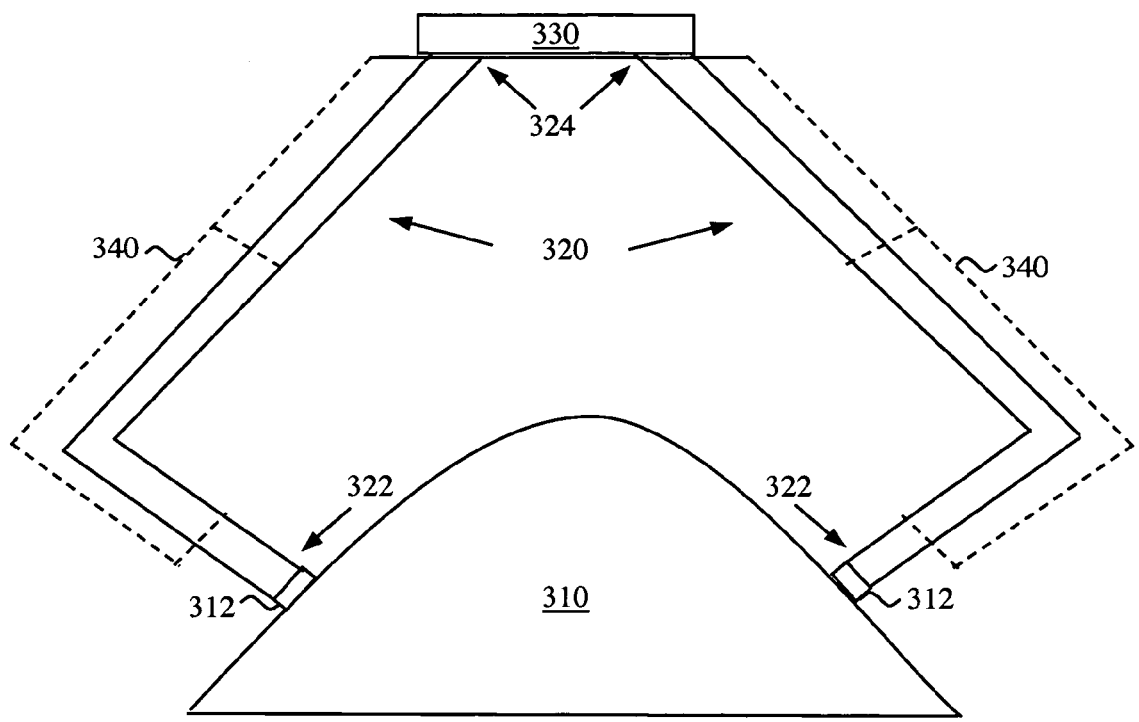
FIG. 3 shows another example of an imaging device according to the present invention.

The device and method of the present invention can also be used for non-planar objects, as shown in FIG. 3. FIG. 3 shows 3-dimensional object 310 containing features 212. Images of features 212 are selectively captured by first ends 322 of image conduits 320. These images are then transmitted along image conduits 320 to seconds ends 324, where they are captured by image capturing element 330. Image conduits 320 are held in place by microholders, indicated by dashed lines 340. With the imaging device depicted in FIG. 3, features that are on different sides of an object can be simultaneously imaged and visualized. Any 3-dimensional object could be imaged according to this embodiment of the invention, including but not limited to biological cells, semiconductor chips, etc.

As one of ordinary skill in the art will appreciate, various changes, substitutions, and alterations could be made or otherwise implemented without departing from the principles of the present invention. Accordingly, the scope of the invention should be determined by the following claims and their legal equivalents.

What is claimed is:

1. An imaging device for optically extracting discrete features of an object, comprising:
   (a) a plurality of image conduits, wherein each image conduit has a first end and a second end;
   (b) a guiding element for fixing the positions of said first ends into a first pattern and said second ends into a second pattern; and
   wherein each of said plurality of image conduits has a uniform diameter;
   wherein each of said first ends acquires an image of a discrete feature of an object;
   wherein said first pattern corresponds to a pattern of said discrete features of said object;
   wherein each of said images acquired by said first end is optically transmitted to said second end through said image conduit;
   wherein each of said optically transmitted images is equal to the size of said acquired image; and
   wherein said second pattern serves to spatially rearrange said optically transmitted images of said discrete features such that all of said optically transmitted images may be simultaneously visualized in one field of view.

2. The imaging device as set forth in claim 1, wherein said image conduit comprises one or more optical fibers.

3. The imaging device as set forth in claim 1, wherein said guiding element is a frame or an array of adjustable microholders.

4. The imaging device as set forth in claim 3, wherein said frame comprises at least a first penetrating layer and a second penetrating layer, wherein said first ends of said image conduits are connected to said first penetrating layer, and said second ends of said conduits are connected to said second penetrating layer.

5. The imaging device as set forth in claim 4, further comprising a flexible layer interposed between said first penetrating layer and said second penetrating layer.

6. The imaging device as set forth in claim 5, wherein said flexible layer comprises flexible O-rings, wherein the number of said flexible O-rings is identical to the number of image conduits.

7. The imaging device as set forth in claim 4, wherein said first penetrating layer and said second penetrating layer comprise Teflon.

8. The imaging device as set forth in claim 1, further comprising one or more lenses optically connected to said first ends.

9. The imaging device as set forth in claim 8, wherein said one or more lenses is one or more GRIN lenses.

10. The imaging device as set forth in claim 1, wherein said first pattern is at least 2 times larger than said second pattern.

11. The imaging device as set forth in claim 1, wherein said first pattern between about 75 and about 1000 times larger than said second pattern.

12. The imaging device as set forth in claim 1, wherein said first and second patterns are a matrix.

13. The imaging device as set forth in claim 1, further comprising an image capturing element optically connected to said second ends.

14. The imaging device as set forth in claim 13, wherein said image capturing element comprises a CCD camera.

15. The imaging device as set forth in claim 1, wherein said uniform diameter is between about 0.1 mm and about 2 mm.

16. A method of optically extracting discrete features of an object, comprising:
   (a) providing a plurality of image conduits, wherein each image conduit has a first end and a second end;
   (b) guiding said first ends into a first pattern and said second ends into a second pattern, wherein said first pattern corresponds to a pattern of discrete features of an object, and wherein said second pattern is a spatially rearranged version of said first pattern;
   (c) acquiring images of said discrete features of said object, but not of space between said discrete features of said object, with said first ends;
   (d) optically transmitting said images of said discrete features along said optical conduits to said second ends, wherein said optical transmitting maintains or increases the size of said acquired images; and
   (e) visualizing all of said transmitted images of said discrete features simultaneously in one field of view.

17. The method as set forth in claim 16, wherein said object is a substrate and said discrete features are regularly spaced deposits of material on said substrate.

18. The method as set forth in claim 16, wherein said object comprises a 3-dimensional surface, and said discrete features are spatially separated features on said surface.

19. The method as set forth in claim 16, wherein said object is a microtiter plate and said features are materials contained in individual wells of said microtiter plate.

20. The method as set forth in claim 16, further comprising magnifying said images during said acquiring.

\* \* \* \* \*